(12) United States Patent
Bohling et al.

(10) Patent No.: US 8,775,728 B2
(45) Date of Patent: Jul. 8, 2014

(54) EXTENDED ADDRESS VOLUME (EAV) ALLOCATION VERIFICATION

(75) Inventors: Neal E. Bohling, Tucson, AZ (US); Joseph V. Malinowski, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/342,863

(22) Filed: Jan. 3, 2012

(65) Prior Publication Data

US 2013/0173805 A1 Jul. 4, 2013

(51) Int. Cl.
*G06F 12/00* (2006.01)
(52) U.S. Cl.
USPC .......................................................... 711/112
(58) Field of Classification Search
None
See application file for complete search history.

(56) References Cited

U.S. PATENT DOCUMENTS

| | | | |
|---|---|---|---|
| 4,310,883 A | 1/1982 | Clifton et al. | |
| 5,018,060 A | 5/1991 | Gelb et al. | |
| 5,717,888 A * | 2/1998 | Candelaria et al. | 711/113 |
| 2005/0283564 A1* | 12/2005 | LeCrone et al. | 711/100 |
| 2007/0113157 A1 | 5/2007 | Perego | |

OTHER PUBLICATIONS

Lovelace et al., "DFSMS V1.10 and EAV Technical Guide," ibm.com/redbooks, Sep. 2009, pp. 1-694.

* cited by examiner

*Primary Examiner* — Brian Peugh
(74) *Attorney, Agent, or Firm* — Zilka-Kotab, PC

(57) ABSTRACT

In one embodiment, a system includes a first storage including track-managed storage and cylinder-managed storage, logic adapted for receiving a request to allocate a target data set on the first storage, logic adapted for determining a size of a source data set on a second storage, wherein data from the source data set will be copied to the target data set, logic adapted for comparing the determined size of the source data set to a break point value to determine if the target data set is to be stored to the track-managed storage or the cylinder-managed storage of the first storage, logic adapted for receiving the data from the source data set, and logic adapted for storing the data from the source data set to the target data set in either track-managed storage or cylinder-managed storage of the first storage based on the comparison.

20 Claims, 4 Drawing Sheets

EXTENDED ADDRESS VOLUME (EAV) ALLOCATION VERIFICATION

BACKGROUND

The present invention relates to allocating memory, and more specifically, this invention relates to verification of extended address volume (EAV) allocation.

Preventing wasted storage space is an important part of many storage systems. For example, enterprise-level storage systems often store large numbers of data sets. Small amounts of wasted space associated with each data set can add up to be a large amount of wasted space in the system.

One environment in which this may occur is IBM's z/OS environment. Certain versions of z/OS, and related products, provide extended address volumes (EAVs) with two types of storage space: track-managed storage and cylinder-managed storage. Track-managed storage is the storage on the EAV that is managed in tracks and cylinders, with each data set stored therein occupying an integral multiple of tracks. Cylinder-managed storage is managed in multi-cylinder units, and each data set stored therein occupies an integral multiple of multi-cylinder units. Requests targeted for the cylinder-managed storage are rounded up to the next multi-cylinder unit. Each cylinder includes 15 tracks, typically.

This system, while providing a number of advantages, may use space inefficiently. This may happen more often in cases where the same allocation is used by default by job control language (JCL) or a user's program or application. For example, a user may allocate a data set as part of an operation for storing data. However, the quantity of data to be stored may be unknown. Many of these programs code a release parameter (e.g., RLSE), and expect unused spaced to be removed from the file and released for use for other storage needs. The user may initiate a request to store the incoming data and specify a size, such as 100 cylinders, with an additional 100 cylinders to be used for overflow. The request may also include a release parameter that indicates that any unused space is to be released. A problem arises in that if the user has allocated the data set in a cylinder managed storage region on an EAV device, the space cannot be released to less than 21 cylinders.

Therefore, if a standard job is specified for allocating files of random sizes, and that standard job specifies a size for storage, for example SPACE=(CYL, (100, 100), RLSE), 100 cylinders will be allocated in cylinder managed storage for any job to be allocated. If only one track is used in that data set by a job, only the space down to 21 cylinders may be released. Before cylinder managed storage, the release parameter would reduce the allocated space down to 1 track, the amount that is actually being used. The difference between these amounts is 21 cylinders multiplied by 15 tracks per cylinder, minus the 1 used track, which results in 314 tracks that are wasted and cannot be used by other data sets.

BRIEF SUMMARY

In one embodiment, a computer program product includes a computer readable storage medium having computer readable program code embodied therewith, the computer readable program code includes computer readable program code configured to receive a request to allocate a target data set on a first storage, computer readable program code configured to determine a size of a source data set on a second storage, wherein data from the source data set will be copied to the target data set, computer readable program code configured to compare the determined size of the source data set to a break point value to determine if the target data set is to be stored to track-managed storage or cylinder-managed storage of the first storage, computer readable program code configured to receive the data from the source data set, and computer readable program code configured to store the data from the source data set to the target data set in either track-managed storage or cylinder-managed storage of the first storage based on the comparison.

In another embodiment, a system includes a first storage including track-managed storage and cylinder-managed storage, logic adapted for receiving a request to allocate a target data set on the first storage, logic adapted for determining a size of a source data set on a second storage, wherein data from the source data set will be copied to the target data set, logic adapted for comparing the determined size of the source data set to a break point value to determine if the target data set is to be stored to the track-managed storage or the cylinder-managed storage of the first storage, logic adapted for receiving the data from the source data set, and logic adapted for storing the data from the source data set to the target data set in either track-managed storage or cylinder-managed storage of the first storage based on the comparison.

In another embodiment, a method includes receiving a request to allocate a target data set on a first storage, determining a size of a source data set on a second storage, wherein data from the source data set will be copied to the target data set, comparing the determined size of the source data set to a break point value to determine if the target data set is to be stored to track-managed storage or cylinder-managed storage of the first storage, receiving the data from the source data set, and storing the data from the source data set to the target data set in either track-managed storage or cylinder-managed storage of the first storage based on the comparison.

Other aspects and embodiments of the present invention will become apparent from the following detailed description, which, when taken in conjunction with the drawings, illustrate by way of example the principles of the invention.

DETAILED DESCRIPTION

Figure 1:
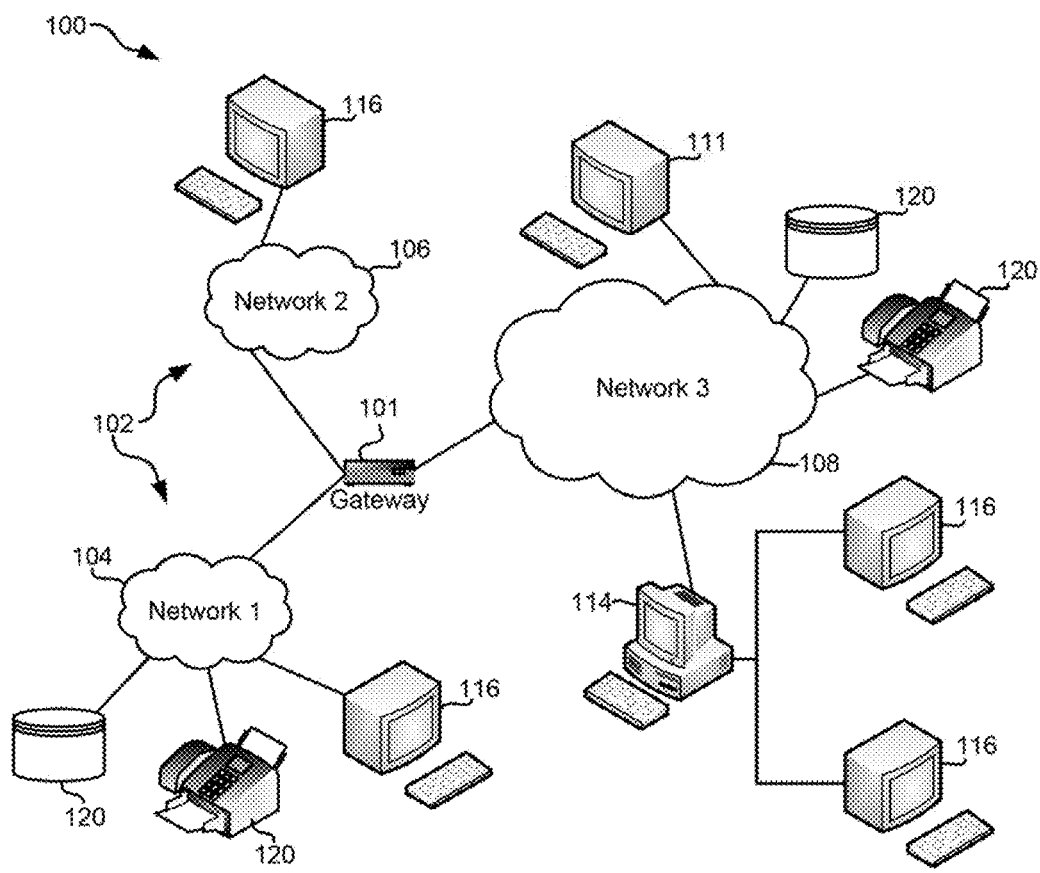
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for verifying allocation of memory in extended address volumes (EAVs).

In one general embodiment, a computer program product includes a computer readable storage medium having computer readable program code embodied therewith, the computer readable program code includes computer readable program code configured to receive a request to allocate a target data set on a first storage, computer readable program code configured to determine a size of a source data set on a second storage, wherein data from the source data set will be copied to the target data set, computer readable program code configured to compare the determined size of the source data set to a break point value to determine if the target data set is to be stored to track-managed storage or cylinder-managed storage of the first storage, computer readable program code configured to receive the data from the source data set, and computer readable program code configured to store the data from the source data set to the target data set in either track-managed storage or cylinder-managed storage of the first storage based on the comparison.

In another general embodiment, a system includes a first storage including track-managed storage and cylinder-managed storage, logic adapted for receiving a request to allocate a target data set on the first storage, logic adapted for determining a size of a source data set on a second storage, wherein data from the source data set will be copied to the target data set, logic adapted for comparing the determined size of the source data set to a break point value to determine if the target data set is to be stored to the track-managed storage or the cylinder-managed storage of the first storage, logic adapted for receiving the data from the source data set, and logic adapted for storing the data from the source data set to the target data set in either track-managed storage or cylinder-managed storage of the first storage based on the comparison.

In another general embodiment, a method includes receiving a request to allocate a target data set on a first storage, determining a size of a source data set on a second storage, wherein data from the source data set will be copied to the target data set, comparing the determined size of the source data set to a break point value to determine if the target data set is to be stored to track-managed storage or cylinder-managed storage of the first storage, receiving the data from the source data set, and storing the data from the source data set to the target data set in either track-managed storage or cylinder-managed storage of the first storage based on the comparison.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
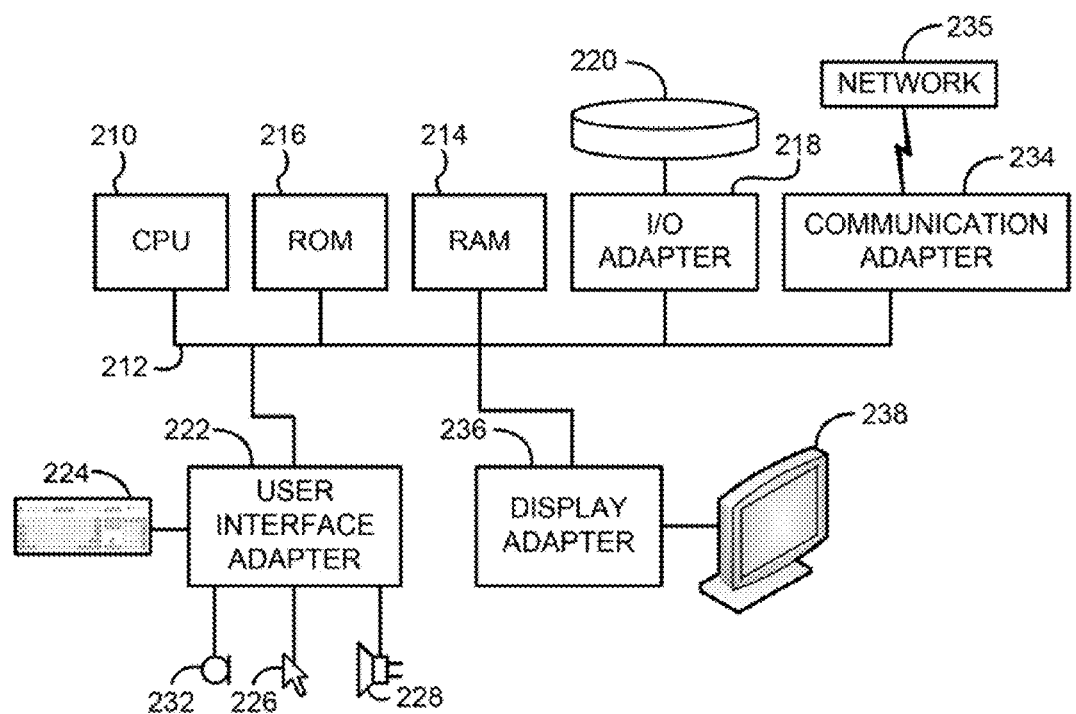
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
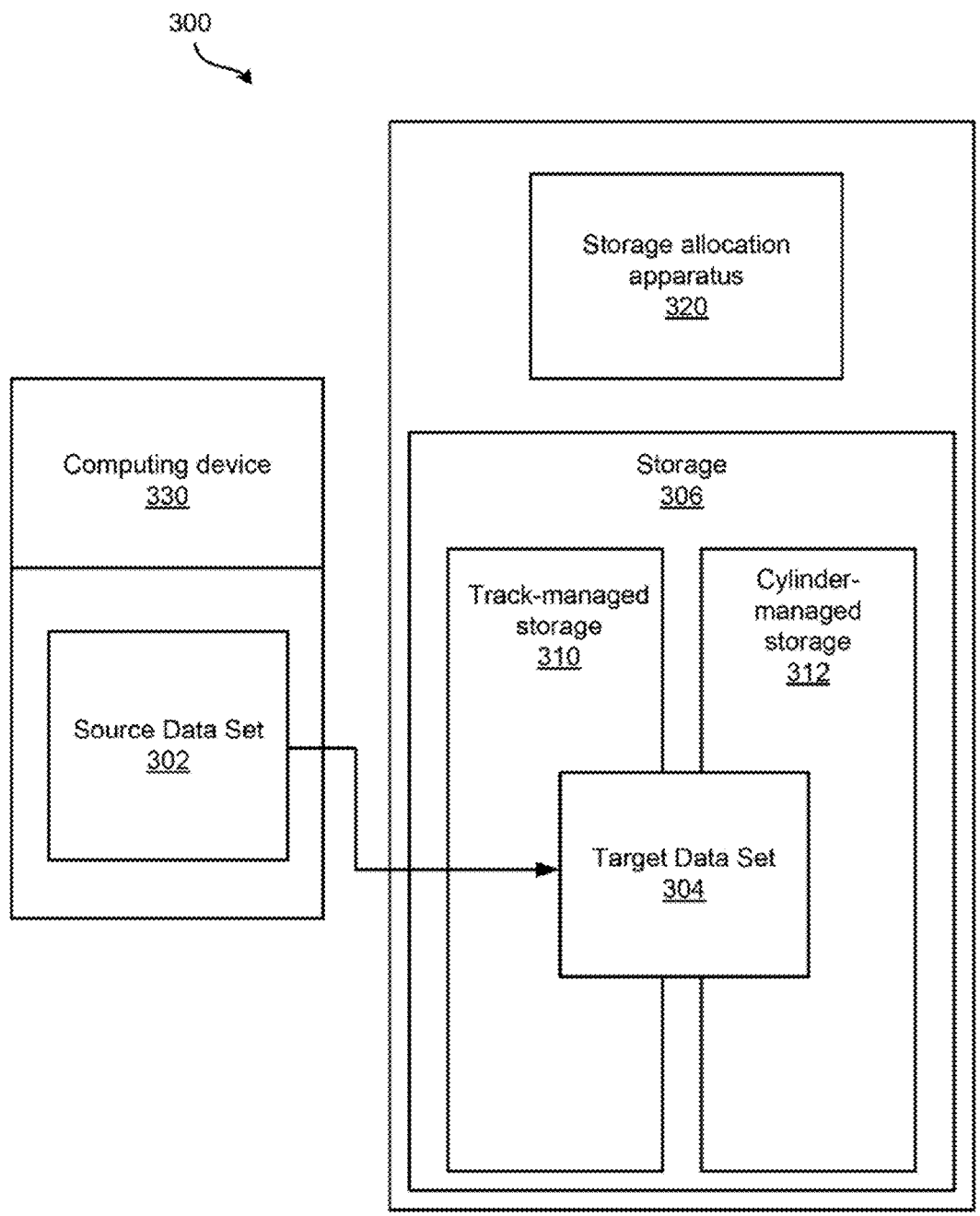
FIG. 3 is a simplified diagram of a system for storing information, according to one embodiment.

Referring now to FIG. 3, a system 300 is shown according to one embodiment. The system 300 is adapted for saving and processing information, and may include one or more computing devices 330. Examples of systems 300 include, but are not limited to, a desktop computer, a mainframe computer, a storage area network (SAN), or any other variety of system as would be understood to one of skill in the art upon reading the present descriptions.

The system 300 includes storage 306. Storage 306 is physical media on which data may be reliably stored for the system 300. The physical media may be, for example, tape-based storage, disk-based storage, solid state storage, RAM, ROM, or other varieties of physical media suitable for storing data. The storage 306 may be a direct access storage device (DASD), in some approaches, or may be connected remotely, intermittently, etc.

As shown in FIG. 3, the storage 306 includes track-managed storage 310 and cylinder-managed storage 312. Track-managed storage 310 and cylinder-managed storage 312 are both storage options within EAVs. Track-managed storage 310 is managed in tracks and cylinders, with each data set stored therein occupying an integral multiple of tracks. Cylinder-managed storage 312 is managed in multi-cylinder units, and each data set stored therein occupies an integral multiple of multi-cylinder units. Requests targeted for the cylinder-managed storage 312 are rounded up to the next multi-cylinder unit. In one embodiment, the multi-cylinder unit may be 12 cylinders. Thus, in one embodiment, if a request specifies an allocation of 20 cylinders, the allocation size is rounded up to 24 cylinders.

FIG. 3 also shows a computing device 330 that may have source data to be stored in the system 300. The computing device 330 may be separate from the system 300 or, in certain embodiments, may be part of the system 300. The computing device 330 is communicatively connected with the system 300 such that the computing device 330 may send source data to the system 300 to be stored as target data. The computing device 330 may be communicatively connected by Ethernet, universal serial port (USB), Fibre Channel, or any other variety of communication connections that allow for data transfer as would be understood by one of skill in the art.

In some embodiments, a source data set 302 on the computing device 330 may be specified to be stored in storage 306. However, the size of the source data set 302 may be unknown. A program, application, logic, etc., on the system 300 may be adapted for allocating a target data set 304 to store the source data set 302 in storage 306. If the size of source data set 302 is unknown, the program may include logic that creates a large target data set 304, and requests that the system 300 release unused space in the target data set 304 after the source data set 302 has been moved and/or copied to the target data set 304.

For example, a program may be adapted for storing a group of emails from the computing device 330. However, in this example, it is unknown how many emails are on the computing device 330, whether there are attachments or other files included, etc. As a result, the size of the source data set 302 is unknown, and therefore the size of the allocation for the target data set 304 in storage 306 needed to store this source data set 302 is also unknown. If the amount of data is small, saving the emails to track-managed storage 310 will likely be the more preferred storage solution; if the amount of data in the emails is large, saving the emails to cylinder-managed storage 312 will likely be the most preferred storage solution.

The storage allocation apparatus 320 provides efficient allocation of storage 306 based on the size of the source data set 302, even if the size of the source data set 302 is unknown when the storage space in storage 306 is to be allocated. The storage allocation apparatus 320 automatically determines if a target data set 304 for the data to be stored should be allocated in track-managed storage 310 or cylinder-managed storage 312. The storage allocation apparatus 320 may do so without making any changes to the job control language (JCL) or application code that initiates the allocation of storage space in storage 306.

According to one embodiment, a user may be given an option to identify and/or indicate which data sets may be allocated to a target data set in track-managed storage versus cylinder-managed storage regardless of the allocation size specified, when possible and/or practicable, by comparing the allocation size specified to the actual amount of data in the source data set. When it is not possible to do so, and if a release (e.g., RLSE command) is specified, then during release processing, the target data set may be moved from cylinder-managed storage back to track-managed storage if the size of the target data set is less than a break point value.

In one approach, the break point value, which designates when cylinder-managed storage is to be used to store a target data set, may be designated, selected, set, etc., by any entity as would be understood by one of skill in the art, such as a user manually, a system automatically, in response to some action or input, etc. The break point value is used when data sets are being allocated, and if the amount of space is greater than the break point value, then the allocated storage is rounded up to 21 cylinders and stored to cylinder-managed storage, otherwise it is stored to track-managed storage. In one approach, a default break point value may be used, and this default break point value may be any number of cylinders, such as 5 cylinders, 8 cylinders, 10 cylinders, 11 cylinders, 12 cylinders, 15 cylinders, etc. For example, if a user allocates a 15 cylinder data set to be stored, and the break point value is 11 cylinders, then the allocated space for the target data set is rounded up to the 21 cylinder size.

Users, in one approach, may be able to specify the break point value using current storage schemes. The break point value is used to decide which type of storage to use (cylinder-managed or track-managed). If the allocation request is larger than this break point value, cylinder-managed storage is used, and the storage space is rounded up to the minimum 21 cylinder allocation size if it is not greater than this amount to begin with. If it is under the break point value, track-managed storage is used and the allocation size is unaffected.

In some embodiments, a user may wish for unused space to not be released (in cases where the user anticipates the data set to grow in size), and therefore the user would not select the release command when storing the data set. However, if the unused space is to be released (such as when the data set will only be stored for a short period of time, if the data set is data that the user is not anticipating to grow in size, etc.), a release part is coded so that it is incapable of holding unused space and this unused space is released.

In one embodiment, in addition to using a break point value to determine the storage type to use, in cases where the user desires to move data from a source data set into a target data set, the user will often use an input data definition (DD) and an output DD in the associated JCL. A new option to the DD card or DD statement which allows a user to reference the amount of used data from the source data set when allocating the target data set on an EAV device may be implemented, in some approaches. In other words, if the user copies data set A to data set B, the user may add a reference field (e.g., REFS) in the JCL DD card or DD statement for data set B that refers back to data set A. In one approach, multiple source DD cards or statements may be pointed to by a single reference. In these cases, the sum of the used space referenced may be used to compute the total amount of space for the allocation. Depending on whether the data set is virtual storage access method (VSAM) compliant or non-VSAM compliant, a high used RBA value may be checked for VSAM or the DS1LSTAR value for non-VSAM compliant data sets to determine the actual amount of used data in the source data set. Any high water mark and/or end of data mark (used-space parameter) may be used in place of the RBA value and/or the DS1LSTAR value according to various approaches.

Next, the amount of space specified by the used-space parameter is compared to the break point value specified by the user. If the used-space parameter for the source data set is less than the break point value, the target data set is allocated in the track-managed storage area. If the used-space parameter for the source data set is greater than or equal to the break point value, the target data set is allocated in the cylinder-managed storage area.

In one example, once the number of tracks that the source data set being copied occupies is determined, such as 1000 tracks, rather than just assuming that all the allocated space is being used and basing the target allocation for the target data set on how much space is allocated to the source data set, the actual amount of tracks being occupied is used to allocate space for the target data set, in this case, 1000 tracks in track-managed storage.

In this way, the storage space in the target data set may be allocated based on the space that is actually needed, rather than making an assumption that all of the allocated source data set space is needed. So in other words, if a 100 cylinder data set is to be copied, but it only has one track of data, rather than allocating another 100 cylinder data set to the target data set, if the source data set is a VSAM data set, the high used RBA value may be queried. If the source data set is a non-VSAM data set, the DS1LSTAR value may be queried and those values essentially point to where the end of the real data is within the source data set. Therefore, based on that value, an amount of real tracks of data there are within the source data set may be computed and if there are more than the break point value, then the target data set may be stored in cylinder-managed storage. If the amount of real tracks of data in the source data set is less than the break point value, then the target data set may be allocated in track-managed storage so that space is not wasted. Generally, the break point value may be compared to an actual amount of real tracks being used in the source data set in order to determine whether to store the target data set in track-managed or cylinder-managed storage.

In some cases, a user may not have a source data set specified (allocating space for future use), or the user may not be using a DD card or DD statement, or the original source data set may not be an adequate indicator of the amount of data that ends up in the target data set, etc. In any of these cases, if the user specified partial release (e.g., RLSE), either via SMS management class or via JCL, then during close, the high used RBA value or DS1LSTAR value (used-space parameter) is checked, to determine whether the data set was allocated in cylinder-managed storage, and if the data set allocation is greater than the break point value. If it is below the break point value, but was allocated using cylinder-managed storage, then during close processing the target data set is moved out of cylinder-managed storage and down into track-managed storage to conserve space. Even though this requires data movement after close, it ensures that space is not wasted and that release processing is honored, as specifically requested.

In one embodiment, a computer program product may comprise a computer readable storage medium having computer readable program code embodied therewith. The computer readable program code may comprise computer readable program code configured to receive a request to allocate a target data set on a first storage, computer readable program code configured to determine a size of a source data set on a second storage, wherein data from the source data set will be copied to the target data set, computer readable program code configured to compare the determined size of the source data set to a break point value to determine if the target data set is to be stored to track-managed storage or cylinder-managed storage of the first storage, computer readable program code configured to receive the data from the source data set, and computer readable program code configured to store the data from the source data set to the target data set in either track-managed storage or cylinder-managed storage of the first storage based on the comparison.

In some embodiments, the break point value may be specified by a user or some other entity, the target data set may be stored to cylinder-managed storage of the first storage if the determined size of the source data set on the second storage is at least as great as the break point value, the request to allocate the target data set may comprise a requested allocation size, in which case the computer program product may further comprise computer readable program code configured to use the requested allocation size as the size of the source data set, computer readable program code configured to store the target data set on the track-managed storage of the first storage when the requested allocation size is less than the break point value, and computer readable program code configured to store the target data set on the cylinder-managed storage of the first storage when the requested allocation size is at least as great as the break point value.

In more embodiments, the computer program product may comprise computer readable program code configured to determine that the request to allocate the target data set comprises a release command, computer readable program code configured to determine an actual size of the target data set after storing the target data set on the first storage, computer readable program code configured to compare the actual size of the target data set to the break point value, computer readable program code configured to relocate the target data set from the cylinder-managed storage to the track-managed storage of the first storage during release processing when the actual size of the target data set is less than the break point value and the target data set is stored on the cylinder-managed storage of the first storage, and computer readable program code configured to relocate the target data set from the track-managed storage to the cylinder-managed storage of the first storage when the actual size of the target data set is at least as great as the break point value and the target data set is stored on the track-managed storage of the first storage.

A reference from the target data set may be made to the source data set, and if it is ever determined that the actual size of the source data set is less than the break point value, the target data set may be relocated down to the track-managed storage, in some approaches.

In further embodiments, the computer readable program code configured to determine the actual size of the target data set on the first storage may comprise computer readable program code configured to determine a used-space parameter associated with the target data set indicating storage space of the target data set. Furthermore, the used-space parameter may comprise a RBA value for a virtual storage access method (VSAM) compatible data set or a DS1LSTAR value for a non-VSAM compatible data set, among other possibilities.

In additional embodiments, the computer readable program code configured to determine the size of the source data set on the second storage may comprise computer readable program code configured to determine a used-space parameter associated with the source data set indicating storage space of the source data set, the used-space parameter being used as the size of the source data set. Furthermore, the used-space parameter may comprise a RBA value for a virtual storage access method (VSAM) compatible data set or a DS1LSTAR value for a non-VSAM compatible data set.

Referring again to FIG. 3, according to another embodiment, a system 300 may comprise a first storage 306 comprising track-managed storage 310 and cylinder-managed storage 312. The system 300 may also include logic adapted for receiving a request to allocate a target data set 304 on the first storage 310, logic adapted for determining a size of a source data set 302 on a second storage (included with computing device 330), wherein data from the source data set 302 will be copied to the target data set 304, logic adapted for comparing the determined size of the source data set 302 to a break point value to determine if the target data set 302 is to be stored to the track-managed storage 310 or the cylinder-managed storage 312 of the first storage 306, logic adapted for receiving the data from the source data set 302, and logic adapted for storing the data from the source data set 302 to the target data set 304 in either track-managed storage 310 or cylinder-managed storage 312 of the first storage 306 based on the comparison.

In one approach, the target data set 304 may be stored to cylinder-managed storage 312 of the first storage 306 if the determined size of the source data set 302 on the second storage is at least as great as the break point value, wherein the request to allocate the target data set 304 comprises a requested allocation size, and the system 300 further comprises logic adapted for using the requested allocation size as the size of the source data set 302, logic adapted for storing the target data set 304 on the track-managed storage 310 of the first storage 306 when the requested allocation size is less than the break point value, and logic adapted for storing the target data set 304 on the cylinder-managed storage 312 of the first storage 306 when the requested allocation size is at least as great as the break point value, logic adapted for determining that the request to allocate the target data set 304 comprises a release command, logic adapted for determining an actual size of the target data set 304 after storing the target data set 304 on the first storage 306, logic adapted for comparing the actual size of the target data set 304 to the break point value, logic adapted for relocating the target data set 304 from the cylinder-managed storage 312 to the track-managed storage 310 of the first storage 306 during release processing when the actual size of the target data set 304 is less than the break point value and the target data set 304 is stored on the cylinder-managed storage 312 of the first storage 306, and logic adapted for relocating the target data set 304 from the track-managed storage 310 to the cylinder-managed storage 312 of the first storage 306 when the actual size of the target data set 304 is at least as great as the break point value and the target data set 304 is stored on the track-managed storage 310 of the first storage 306.

Figure 4:
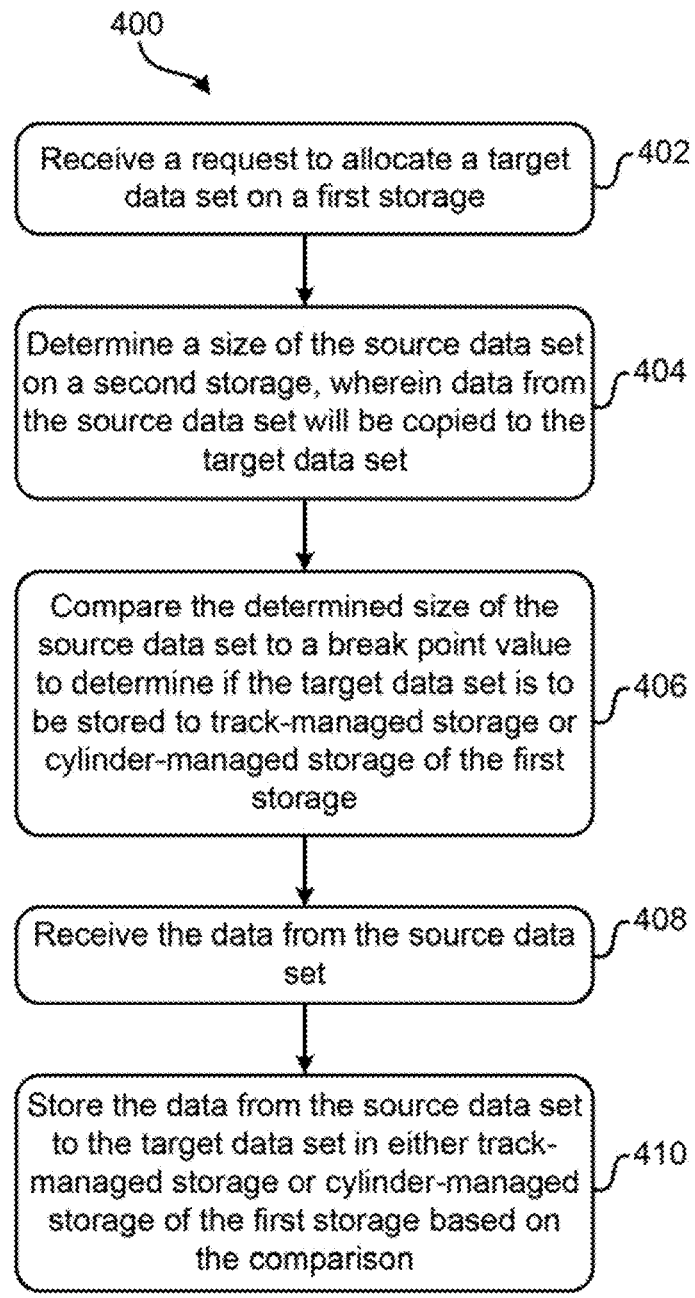
FIG. 4 is a flowchart of a method according to one embodiment.

Now referring to FIG. 4, a method 400 is shown according to one embodiment. The method 400 may be carried out in any desired environment, including those described in FIGS. 1-3, among others. Additional and/or less operations than those described in regard to FIG. 4 may be implemented in method 400 according to various embodiments, as would be understood by one of skill in the art upon reading the present descriptions.

In operation 402, a request to allocate a target data set on a first storage is received. Any system, program, application, user, etc., may send the request, as would be understood by one of skill in the art.

The first storage may be any type of storage as would be understood by one of skill in the art, such as disk-based storage, tape-based storage, solid state storage, a portion thereof such as a volume, etc.

In operation 404, a size of a source data set on a second storage is determined. This determination is made because data from the source data set will be copied to the target data set, so the size of the source data set will dictate a size of the target data set to be allocated on the first storage.

In operation 406, the determined size of the source data set is compared to a break point value to determine if the target data set is to be stored to track-managed storage or cylinder-managed storage of the first storage.

In one embodiment, the break point value may be specified by a user, by a program, by an application, by a system, etc.

In operation 408, the data from the source data set is received. Any method of transmitting and receiving the data may be used, and any communications type may be used to transmit the data, as would be understood by one of skill in the art.

In operation 410, the data from the source data set is stored to the target data set in either track-managed storage or cylinder-managed storage of the first storage based on the comparison.

In one embodiment, the target data set may be stored to cylinder-managed storage of the first storage if the determined size of the source data set on the second storage is at least as great as the break point value, otherwise it may be stored to track-managed storage of the first storage.

In some approaches, the request to allocate the target data set may comprise a requested allocation size. In these cases, the requested allocation size may be used as the size of the source data set, the target data set may be stored on the track-managed storage of the first storage when the requested allocation size is less than the break point value, and the target data set may be stored on the cylinder-managed storage of the first storage when the requested allocation size is at least as great as the break point value.

In further approaches, when it is determined that the request to allocate the target data set comprises a release command, an actual size of the target data set may be determined after storing the target data set on the first storage, the actual size of the target data set may be compared to the break point value, and during release processing the target data set may be relocated from the cylinder-managed storage to the track-managed storage of the first storage when the actual size of the target data set is less than the break point value and the target data set is stored on the cylinder-managed storage of the first storage, and the target data set may be relocated from the track-managed storage to the cylinder-managed storage of the first storage when the actual size of the target data set is at least as great as the break point value and the target data set is stored on the track-managed storage of the first storage.

In one approach, determining the actual size of the target data set on the first storage may comprise determining a used-space parameter associated with the target data set indicating storage space of the target data set. In another approach, determining the size of the source data set on the second storage may comprise determining a used-space parameter associated with the source data set indicating storage space of the source data set, the used-space parameter being used as the size of the source data set. In these approaches, the used-space parameter may be a RBA value for a VSAM compatible data set or a DS1LSTAR value for a non-VSAM compatible data set, among other possibilities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, the computer program product comprising a computer readable storage medium having computer readable program code embodied therewith, the computer readable program code being readable and/or executable by a processor to:
receive a request to allocate a target data set on a first storage;

determine a size of a source data set on a second storage, wherein data from the source data set will be copied to the target data set;

compare the determined size of the source data set to a break point value to determine if the target data set is to be stored to track-managed storage or cylinder-managed storage of the first storage, wherein the break point value indicates an amount of storage space;

receive the data from the source data set; and store the data from the source data set to the target data set in either track-managed storage or cylinder-managed storage of the first storage based on the comparison, wherein the target data set is stored to cylinder-managed storage of the first storage when the determined size of the source data set on the second storage is at least as great as the break point value.

2. The computer program product of claim 1, wherein the break point value is specified by a user, and wherein a size of the target data set is rounded up to a minimum of 21 cylinders in allocation size when the target data set is stored to cylinder-managed storage of the first storage and the determined size of the source data set is less than 21 cylinders in size.

3. The computer program product of claim 1, wherein the target data set is stored to track-managed storage of the first storage when the determined size of the source data set on the second storage is less than the break point value.

4. The computer program product of claim 1, wherein the request to allocate the target data set comprises a requested allocation size, the computer readable program code being further readable and/or executable by the processor to:

use the requested allocation size as the size of the source data set;

store the target data set on the track-managed storage of the first storage when the requested allocation size is less than the break point value; and store the target data set on the cylinder-managed storage of the first storage when the requested allocation size is at least as great as the break point value.

5. The computer program product of claim 4, the computer readable program code being further readable and/or executable by the processor to:

determine that the request to allocate the target data set comprises a release command;

determine an actual size of the target data set after storing the target data set on the first storage;

compare the actual size of the target data set to the break point value;

relocate the target data set from the cylinder-managed storage to the track-managed storage of the first storage when the actual size of the target data set is less than the break point value and the target data set is stored on the cylinder-managed storage of the first storage; and relocate the target data set from the track-managed storage to the cylinder-managed storage of the first storage when the actual size of the target data set is at least as great as the break point value and the target data set is stored on the track-managed storage of the first storage.

6. The computer program product of claim 5, wherein the computer readable program code configured to determine the actual size of the target data set on the first storage is further readable and/or executable by the processor to determine a used-space parameter associated with the target data set indicating storage space of the target data set.

7. The computer program product of claim 6, wherein the used-space parameter comprises a RBA value for a virtual storage access method (VSAM) compatible data set or a DS1LSTAR value for a non-VSAM compatible data set.

8. The computer program product of claim 1, wherein the computer readable program code configured to determine the size of the source data set on the second storage is further readable and/or executable by the processor to determine a used-space parameter associated with the source data set indicating storage space of the source data set, the used-space parameter being used as the size of the source data set.

9. The computer program product of claim 8, wherein the used-space parameter comprises a RBA value for a virtual storage access method (VSAM) compatible data set or a DS1LSTAR value for a non-VSAM compatible data set.

10. A system, comprising:
a first storage comprising:
track-managed storage; and
cylinder-managed storage;
logic adapted for receiving a request to allocate a target data set on the first storage;
logic adapted for determining a size of a source data set on a second storage, wherein data from the source data set will be copied to the target data set;
logic adapted for comparing the determined size of the source data set to a break point value to determine if the target data set is to be stored to the track-managed storage or the cylinder-managed storage of the first storage;
logic adapted for receiving the data from the source data set; and
logic adapted for storing the data from the source data set to the target data set in either track-managed storage or cylinder-managed storage of the first storage based on the comparison.

11. The system as recited in claim 10,
wherein the target data set is stored to cylinder-managed storage of the first storage if the determined size of the source data set on the second storage is at least as great as the break point value;
wherein the request to allocate the target data set comprises a requested allocation size, and
the system further comprising:
logic adapted for using the requested allocation size as the size of the source data set;
logic adapted for storing the target data set on the track-managed storage of the first storage when the requested allocation size is less than the break point value; and
logic adapted for storing the target data set on the cylinder-managed storage of the first storage when the requested allocation size is at least as great as the break point value;
logic adapted for determining that the request to allocate the target data set comprises a release command;
logic adapted for determining an actual size of the target data set after storing the target data set on the first storage;
logic adapted for comparing the actual size of the target data set to the break point value;
logic adapted for relocating the target data set from the cylinder-managed storage to the track-managed storage of the first storage when the actual size of the target data set is less than the break point value and the target data set is stored on the cylinder-managed storage of the first storage; and
logic adapted for relocating the target data set from the track-managed storage to the cylinder-managed storage of the first storage when the actual size of the target data set is at least as great as the break point value and the target data set is stored on the track-managed storage of the first storage.

12. A method, comprising:
receiving a request to allocate a target data set on a first storage;
determining a size of a source data set on a second storage, wherein data from the source data set will be copied to the target data set by at least one of:
determining a used-space parameter associated with the source data set indicating storage space of the source data set, the used-space parameter being used as the size of the source data set; and
using a requested allocation size from the request to allocate the target data set as the size of the source data set;
comparing the determined size of the source data set to a break point value to determine if the target data set is to be stored to track-managed storage or cylinder-managed storage of the first storage;
receiving the data from the source data set; and
storing the data from the source data set to the target data set in either track-managed storage or cylinder-managed storage of the first storage based on the comparison.

13. The method as recited in claim 12, wherein the break point value is specified by a user.

14. The method as recited in claim 12, wherein the target data set is stored to cylinder-managed storage of the first storage if the determined size of the source data set on the second storage is at least as great as the break point value.

15. The method as recited in claim 12, further comprising:
storing the target data set on the track-managed storage of the first storage when the requested allocation size is less than the break point value; and
storing the target data set on the cylinder-managed storage of the first storage when the requested allocation size is at least as great as the break point value.

16. The method as recited in claim 15, further comprising:
determining that the request to allocate the target data set comprises a release command;
determining an actual size of the target data set after storing the target data set on the first storage;
comparing the actual size of the target data set to the break point value;
relocating the target data set from the cylinder-managed storage to the track-managed storage of the first storage when the actual size of the target data set is less than the break point value and the target data set is stored on the cylinder-managed storage of the first storage; and
relocating the target data set from the track-managed storage to the cylinder-managed storage of the first storage when the actual size of the target data set is at least as great as the break point value and the target data set is stored on the track-managed storage of the first storage.

17. The method as recited in claim 16, wherein determining the actual size of the target data set on the first storage comprises determining a used-space parameter associated with the target data set indicating storage space of the target data set.

18. The method as recited in claim 17, wherein the used-space parameter comprises a RBA value for a virtual storage access method (VSAM) compatible data set or a DS1LSTAR value for a non-VSAM compatible data set.

19. The method as recited in claim 12, wherein the target data set is stored to track-managed storage of the first storage when the determined size of the source data set on the second storage is less than the break point value.

20. The method as recited in claim 12, wherein the used-space parameter comprises a RBA value for a virtual storage access method (VSAM) compatible data set or a DS1LSTAR value for a non-VSAM compatible data set.

* * * * *